United States Patent [19]

Kolowski et al.

[11] 4,019,551
[45] Apr. 26, 1977

[54] CHIPPERLESS RADIAL PLY TIRE

[75] Inventors: Michael A. Kolowski, Tallmadge; George J. Siefert, North Canton, both of Ohio

[73] Assignee: The Goodyear Tire & Rubber Company, Akron, Ohio

[22] Filed: Jan. 23, 1976

[21] Appl. No.: 651,746

[52] U.S. Cl. .................. 152/354; 152/362 CS; 152/DIG. 16
[51] Int. Cl.² .................. B60C 15/06; B60C 9/02
[58] Field of Search ..... 152/362 R, 362 CS, 357 R, 152/357 A, 354, 355, DIG. 16

[56] References Cited

UNITED STATES PATENTS

| | | | |
|---|---|---|---|
| 3,038,518 | 6/1962 | Hershey | 152/362 R |
| 3,115,179 | 12/1963 | Shepherd | 152/DIG. 16 |
| 3,282,724 | 11/1966 | Atwell | 152/362 R X |
| 3,557,860 | 1/1971 | Maiocchi | 152/362 R |
| 3,682,223 | 8/1972 | Simpson | 152/362 R |
| 3,921,693 | 11/1975 | Suzuki et al. | 152/362 R |

*Primary Examiner*—Drayton E. Hoffman
*Assistant Examiner*—Fred A. Silverberg
*Attorney, Agent, or Firm*—F. W. Brunner; H. E. Hummer

[57] ABSTRACT

A chipperless radial ply tire having its carcass ply endings wrapped axially outwardly about the bead cores and terminating along a neutral stress line and with the air impervious liner extending axially outwardly about the bead cores and completely encasing the ply endings and further including a hard chafer strip extending at least from adjacent the radially outer extremity of the bead core to about 40 percent of the section height of the tire.

9 Claims, 2 Drawing Figures

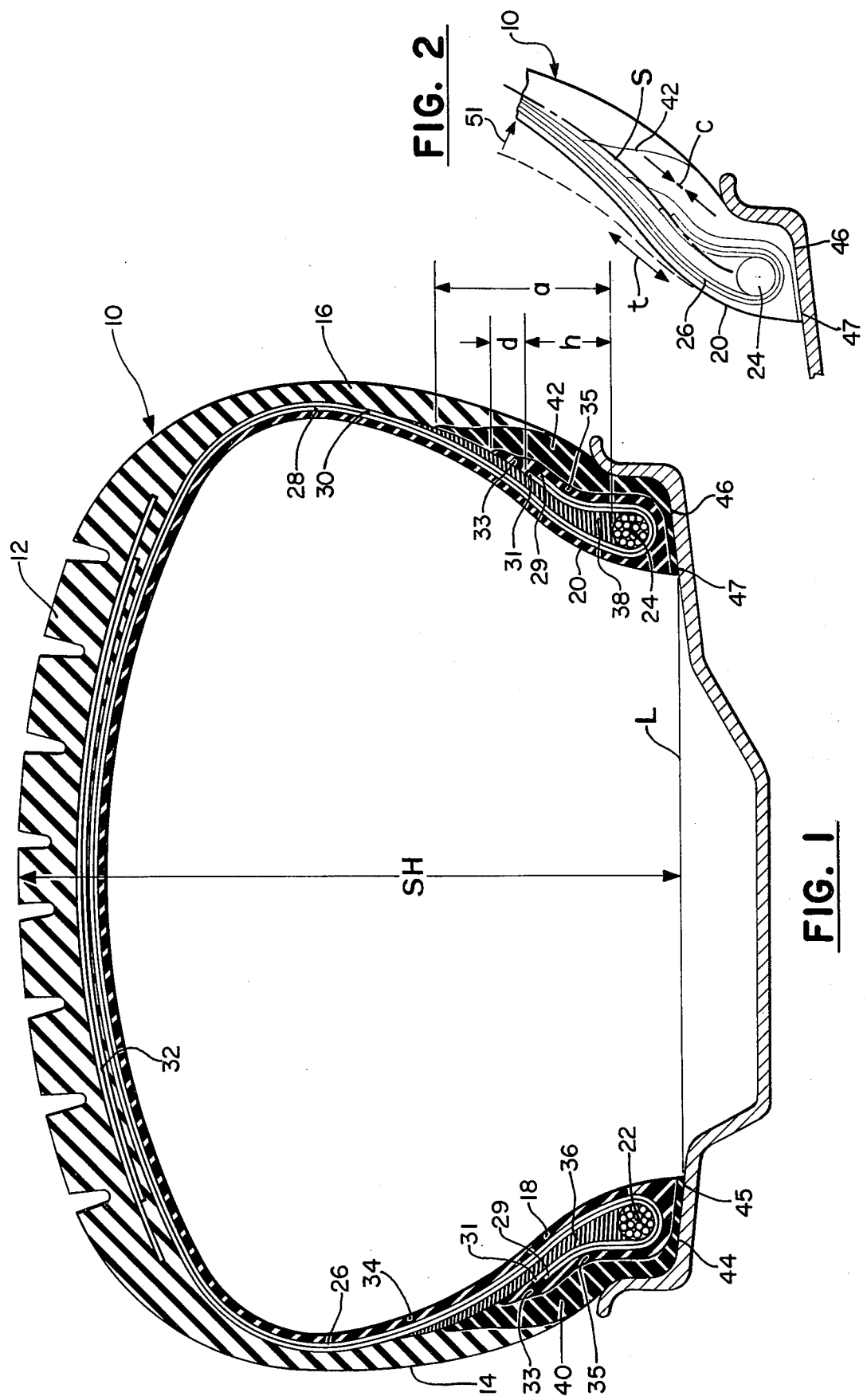

CHIPPERLESS RADIAL PLY TIRE

This invention relates to pneumatic tires and more particularly to radial ply tire.

Radial ply tires by virtue of their very flexible sidewalls provide a soft comfortable ride. However, the fact that the sidewalls are so flexible tends to reduce the lateral stability and cornering properties of such tires. In the past, this problem has been overcome by the addition of fabric reinforcing layers in the bead area and extending into the sidewall. These reinforcing materials are generally referred to as "chippers" and have their ends disposed in the high flex zone of the sidewall, thus making them somewhat vulnerable to loss of adhesion to adjacent componets. Such chippers also add to the cost of the tire. As example of a means to eliminate fabric reinforcing structures in the lower sidewall without sacrificing lateral stability or steering control has been suggested in U.S. Pat. No. 3,232,331. This patent suggests use of a hard rubber chafer strip extending from the base of the bead portion radially outwardly to approximately the mid height of the tire.

The present invention provides an improvement over this concept whereby the lateral stability is maintained and at the same time the possibility of loss of adhesion at the ply is reduced.

It is an object, therefore, of the present invention to provide a radial ply tire which is free of additional cord reinforced structural members in the sidewall adjacent the beads, yet exhibits good steering, handling and durability properties.

The invention accordingly consists in the features of construction, combination of elements and arrangement of parts which will be exemplified in the construction hereinafter set forth and the scope of the application of which will be indicated in the appended claims.

IN THE DRAWINGS

FIG. 1 is a cross sectional view of a tire made according to the present invention and mounted on a rim;

FIG. 2 is a cross sectional view of a section of the tire of FIG. 1 and illustrating the method of determining the neutral stress line or bead area.

In the drawings and particularly with reference to FIG. 1, there is illustrated a tire 10 having a tread portion 12, a pair of sidewall portions 14, 16 extending radially inwardly from the axially outer edges of a tread portion 12 and terminating in a pair of bead portions 18, 20. Each bead portion 18, 20 includes an annular inextensible bead core 22, 24 respectively. A carcass ply structure 26 extends circumferentially about the tire and from the bead core 22 to bead core 24. The carcass ply structure 26 in the particular embodiment illustrated includes two radial plies 28, 30 of any suitable tire cord fabric such as, by way of example only, nylon, polyester, rayon, fiberglass, steel or Aramid.

For purposes of this invention a radial ply tire shall be considered a tire in which the cords in the carcass structure extend at an angle no greater than 15° with respect to planes containing the rotational axis of the tire substantially from the rim flange to the belt structure. As is typical in radial ply tires, a substantial inextensible belt structure 32 extends circumferentially about the carcass structure and in axial directions for substantially the axial width of the tread. The belt structure 32 may be of any suitable material or construction.

An air impervious inner liner 34 is disposed adjacent the air cavity of the tire and completely isolates the carcass structure from the air cavity. A pair of annular hard rubber apex strips 36, 38 extend radially outwardly from the respective bead cores 22, 24 and taper to a point at their radially outer extremities. The carcass plies 28, 30 have their end portions 29, 31 wrapped axially outwardly about the respective bead cores 22, 24 and extending radially outwardly adjacent the respective hard rubber apex strip 36, 38. Both turn-ups or end portions 29, 31 terminate adjacent the respective apex strip 36, 38. The inner liner 34 is turned axially outwardly about the respective bead cores /and extends radially outwardly adjacent the turn-up portions 29, 31 of the carcass plies 28, 30 and completely encases the endings thereof as illustrated at 33.

A hard rubber chafer strip 40, 42 is disposed axially outwardly of the turned-up portion 35 of the liner and extends radially outwardly at least from a point axially adjacent the radially outer extremity of the respective bead core 22, 24 at least to a point radially outwardly of the turned-up portion 35 of the liner 34. It is preferred, however, that the chafer 40, 42 extend radially inwardly to the tapered bead seat surface 44, 46 and may extend radially outwardly beyond the apex strips 36, 38. The chafer 40, 42 may also extend along the bead seat surface 44, 46 to the toe 45, 47 of the respective bead portions 18, 20.

The carcass ply endings 29, 30 should terminate at a height $h$ equal to between one and three times the radial height of the bead core 22, 24 which for passenger car tires is about three-tenths of an inch (0.76 centimeters) to nine-tenths of an inch (2.29 centimeters) radially outwardly of the radially outer extent of the respective bead core 22, 24. Further, in passenger car tires, the turned-up portion 35 of the air-impervious liner 34 should extend a distance d between two-tenths of an inch (0.51 centimeters) and five-tenths of an inch (1.27 centimeters radially outwardly beyond the radially outermost extremity of the respectively associated turned-up portion 29, 30 of the carcass plies 28, 30.

The chafer strips 40, 42 should extend a distance a radially outwardly to between 30 and 50 percent of the section height SH of the tire 10. For purposes of this invention, section height SH of the tire shall be the radial height of the tire from the line L tangent to the bead seat surfaces 44, 46 radially outwardly to the radially outermost extremity of the tread surface. The hard chafer strips 40, 42 should have a modulus of elasticity of between 11 and 13.5 meganewtons/meter$^2$ at 300 percent elongation where 10 meganewton/m$^2$ = 1450 psi strips 40, 42 should have a Shore A hardness of between 70 and 90 durometer and preferably between 75 and 80 durometer. The apex strips 36, 38 should have a somewhat higher modulus of elasticity which should be between 19 and 22 meganewtons/meter$^2$ at 300 percent elongation. Also, the hardness of the apex strip is generally greater than that of the chafer strip and should be between 75 and 90 durometer, with the preferred range being between 84 and 88.

The configuration of the apex strips and chafer strips are such that the turned-up portions 29 and 31 terminate along the neutral stress contour line of the respective bead portion 18, 20. For purposes of this invention the neutral stress contour line shall be that line extending from the bead core radially outwardly in the lower sidewall area in which the bending stresses are the least. Specifically and with reference to FIG. 2, there is illustrated the lower sidewall area of the tire 10 mounted on a rim and being flexed substantially as it would when the tire is loaded. For purposes of clarity and illustration the components of the tire are shown only in outline form. The inside contour of the tire 10 in its inflated and unloaded state is illustrated in dash lines and the loaded tire contour is illustrated in solid lines. It will be observed that as the tire sidewall flexes axially outwardly as indicated at 51 the portion of the bead area adjacent the air cavity is under substantial tension t whereas the portion of the tire adjacent the outside surface is under substantial compression c. The neutral stress contour line s is that line at which the stresses under these conditions change from tension to compression.

It will be appreciated that this neutral stress line can vary somewhat depending on the load and inflation pressure and for purposes of this invention the neutral stress line shall be determined for a tire mounted on a standard rim, inflated to design inflation pressure and statically loaded to between 75 and 100 percent of maximum load. Under these conditions the centerline of at least the radially outermost 0.2 inch (0.31 centimeter) of the turned-up portion of the carcass structure should not deviate from the neutral stress line s by more than one and one-half the thickness of the carcass plies. A carcass ply is intended to include the cords and the normal coat of rubber applied during the calendering operation. The centerline of a carcass structure is the geometric center of the ply structure. Thus, for a single ply carcass structure, the centerline will be coincident with the centerline of the cords and for a two ply carcass structure the centerline will be the parting line between the two plies.

In a specific example, a group of size DR78-14 tires were constructed in accordance with the present invention. The tires included two carcass plies extending at angles of 90° with respect to the circumferential centerline of the tire and were made of 1000/2.36 ends per inch (14.2 ends per centimeter) polyester cord. The belt structure included two plies of steel cord fabric extending at alternate angles of 22° with respect to the circumferential centerline. The apex strips 36, 38 extended radially outwardly to about 40 percent of the section height of the tire, had a Shore A hardness of 86 durometer and a modulus of 20.5 meganewtons/meter$^2$ at 300 percent elongation. The first carcass ply 28 terminated 0.7 inches (1.78 centimeters) radially outwardly of the bead core while the second carcass ply 36 terminated about 0.65 inches (1.65 centimeters) radially outwardly of the bead core. The chafer strips 40, 42 extended from the bead seat surfaces radially outwardly to about 30 percent of the section height of the tire, had a Shore A hardness of 78 durometer and a modulus of 12 meganewtons/meter$^2$ at 300 percent elongation. The point of maximum thickness of the chafer strip was located within ⅛ of an inch radially outwardly of the radially outer extremity of the unloaded contact point of the tire with the rim flange. The carcass ply endings extended along the neutral stress contour line for at least the outer 0.2 inch (0.31 centimeter) of each ply.

Several hundred tires made in this fashion were tested for ply separation in the lower sidewall area. In no case did any design related ply separation occur. These tires were also tested for force and moment against standard production radial ply tires having wire fabric reinforcing structures in the lower sidewall area and were found to have comparable properties.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread portion, a pair of sidewall portions, a pair of bead portions and a carcass structure extending circumferentially about the tire and from bead portion to bead portion, said tire being characterized by the carcass plies being turned axially outwardly about and radially outwardly of each bead core to a point between one and three times the thickness of the bead core radially outwardly of the bead core with the centerline of at least the radially outer two-tenths of an inch of the turned-up portion of the carcass structure being no further removed from the neutral stress line than one and one-half times the thickness of the carcass structure; an air impervious inner liner extending about the bead core and completely encasing the carcass plies and an annular hard rubber chafer strip disposed axially outwardly of the turned-up portion of the carcass ply and extending from a point axially adjacent the radially outer extremity of the bead core to a point radially outwardly of the terminus of the air impervious inner liner.

2. A tire as claimed in claim 1 wherein the chafer strip extends radially outwardly to a point between 30 and 50 percent of the section height of a tire.

3. A tire as claimed in claim 2 wherein the chafer extends around the bead core to the toe of the head portion.

4. A tire as claimed in claim 1 wherein the chafer strip has a Shore A hardness of between 70 and 90 durometer and a modulus of 11.5 to 13.5 meganewtons/meter$^2$ at 300 percent elongation.

5. A tire as claimed in claim 1 further including an annular apex strip extending radially outwardly of and from the bead core, tapered to a point at its radially outer extremity and separating the carcass ply endings from the carcass ply, said apex strips having a Shore A hardness of between 75 and 90 durometer and a modulus of between 19 and 32 meganewtons/meter$^2$ at 300 percent elongation.

6. A tire as claimed in claim 5 wherein said apex strip extends radially outwardly beyond said chafer strip.

7. A tire as claimed in claim 5 wherein the chafer extends around the bead core to the toe of the bead portion.

8. A tire as claimed in claim 7 wherein the chafer strip has a Shore A hardness of between 70 and 90 durometer and a modulus of 11.5 to 13.5 meganewtons/meter$^2$ at 300 percent elongation.

9. A tire as claimed in claim 1 wherein the chafer extends around the bead core to the toe of the bead portion.

* * * * *

UNITED STATES PATENT AND TRADEMARK OFFICE
CERTIFICATE OF CORRECTION

PATENT NO. : 4,019,551
DATED : April 26, 1977
INVENTOR(S) : Michael A. Kolowski and George J. Siefert It is certified that error appears in the above-identified patent and that said Letters Patent are hereby corrected as shown below:

Column 1, line 5; insert -- a -- after "to".

Column 1, line 63; delete "substantial" and insert -- substantially -- .

Column 2, line 29, delete "30" and insert -- 31 -- .

Column 2, line 51; delete "meganewton" and insert -- meganewtons

Column 2, line 52; after "psi" insert -- . The chafer -- .

Column 4, line 39; delete "head" and insert -- bead -- .

Signed and Sealed this

Thirtieth Day of June 1981

[SEAL]

Attest:

RENE D. TEGTMEYER

Attesting Officer

Acting Commissioner of Patents and Trademarks